US008910255B2

(12) United States Patent
Nice et al.

(10) Patent No.: US 8,910,255 B2
(45) Date of Patent: Dec. 9, 2014

(54) AUTHENTICATION FOR DISTRIBUTED SECURE CONTENT MANAGEMENT SYSTEM

(75) Inventors: Nir Nice, Kfar Veradim (IL); Oleg Ananiev, Migdal Haemeq (IL); John F. Wohlfert, Everett, WA (US); Amit Finkelstein, Haifa (IL); Alexander Teplitsky, Nesher (IL)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 12/127,803

(22) Filed: May 27, 2008

(65) Prior Publication Data

US 2009/0300739 A1 Dec. 3, 2009

(51) Int. Cl.
*H04L 29/06* (2006.01)
*G06F 21/31* (2013.01)

(52) U.S. Cl.
CPC ............ *H04L 63/0281* (2013.01); *H04L 63/08* (2013.01); *G06F 21/31* (2013.01); *H04L 63/0884* (2013.01)
USPC .............. 726/6; 726/4; 726/5; 726/9; 726/10; 713/155; 713/168; 709/223; 709/229; 709/240

(58) Field of Classification Search
CPC . H04L 63/0281; H04L 63/08; H04L 63/0884; H04L 63/102; H04L 29/0809; H04L 29/08738; H04L 29/08747
USPC .......................................................... 726/6
See application file for complete search history.

(56) References Cited

U.S. PATENT DOCUMENTS

| | | | |
|---|---|---|---|
| 5,684,950 | A | 11/1997 | Dare et al. |
| 5,987,610 | A | 11/1999 | Franczek et al. |
| 6,052,788 | A | 4/2000 | Wesinger |
| 6,119,235 | A | 9/2000 | Vaid et al. |
| 6,182,148 | B1 | 1/2001 | Tout |
| 6,347,375 | B1 | 2/2002 | Reinert et al. |
| 6,401,125 | B1 * | 6/2002 | Makarios et al. ............. 709/229 |

(Continued)

FOREIGN PATENT DOCUMENTS

| | | |
|---|---|---|
| CN | 1516833 A | 7/2004 |
| CN | 1540944 A | 10/2004 |

(Continued)

OTHER PUBLICATIONS

Komura Takaaki et al. "Design and Implementation of Web Forward Proxy with Shibboleth Authentication." 2011 IEEE/IPSJ 11th International Symposium on Applications and Internet (SAINT), pp. 321-326.*

(Continued)

*Primary Examiner* — Thanhnga B Truong
*Assistant Examiner* — Narciso Victoria
(74) *Attorney, Agent, or Firm* — Henry Gabryjelski; Kate Drakos; Micky Minhas

(57) ABSTRACT

Aspects of the subject matter described herein relate to authentication for a distributed secure content management system. In aspects, a request to access a resource available through the Internet is routed to a security component. The security component is one of a plurality of security components distributed throughout the Internet and responsible for authenticating entities associated with an enterprise. The security component determines an authentication protocol to use with the entity and then authenticates the entity. If the entity is authenticated, the entity is allowed to use a forward proxy.

16 Claims, 5 Drawing Sheets

(56) References Cited

U.S. PATENT DOCUMENTS

| | | | |
|---|---|---|---|
| 6,484,203 B1 | 11/2002 | Porras et al. |
| 6,535,227 B1 | 3/2003 | Fox et al. |
| 6,650,890 B1 | 11/2003 | Irlam et al. |
| 6,757,740 B1 | 6/2004 | Parekh et al. |
| 6,760,768 B2 | 7/2004 | Holden et al. |
| 6,789,202 B1 | 9/2004 | Ko et al. |
| 6,871,279 B2 | 3/2005 | Sames et al. |
| 6,920,558 B2 | 7/2005 | Sames et al. |
| 6,954,799 B2 | 10/2005 | Lerner |
| 7,003,117 B2 | 2/2006 | Kacker et al. |
| 7,043,563 B2 | 5/2006 | Vange et al. |
| 7,058,970 B2 | 6/2006 | Shaw |
| 7,096,215 B2 | 8/2006 | Bates et al. |
| 7,124,438 B2 | 10/2006 | Judge et al. |
| 7,178,166 B1 | 2/2007 | Taylor et al. |
| 7,221,935 B2 | 5/2007 | Barriga-Caceres |
| 7,287,271 B1 | 10/2007 | Riggins |
| 7,318,237 B2 | 1/2008 | Moriconi et al. |
| 7,346,923 B2 | 3/2008 | Atkins et al. |
| 7,370,364 B2 | 5/2008 | Dobbins et al. |
| 7,383,433 B2 | 6/2008 | Yeager et al. |
| 7,451,488 B2 | 11/2008 | Cooper et al. |
| 7,496,658 B2 | 2/2009 | Southam et al. |
| 7,562,382 B2 | 7/2009 | Hinton et al. |
| 7,594,224 B2 | 9/2009 | Patrick et al. |
| 7,603,548 B2 | 10/2009 | Patrick et al. |
| 7,761,923 B2 | 7/2010 | Khuli |
| 7,877,492 B2 * | 1/2011 | Chawla et al. | 709/229 |
| 7,899,849 B2 | 3/2011 | Chaudhry |
| 7,954,144 B1 * | 5/2011 | Ebrahimi et al. | 726/12 |
| 2003/0005152 A1 | 1/2003 | Diwan et al. |
| 2003/0041263 A1 | 2/2003 | Devine et al. |
| 2003/0051026 A1 | 3/2003 | Carter et al. |
| 2003/0061506 A1 | 3/2003 | Cooper et al. |
| 2003/0093680 A1 * | 5/2003 | Astley et al. | 713/183 |
| 2003/0110392 A1 | 6/2003 | Aucsmith et al. |
| 2004/0019656 A1 | 1/2004 | Smith et al. |
| 2004/0064693 A1 | 4/2004 | Pabla et al. |
| 2004/0073629 A1 | 4/2004 | Bazot et al. |
| 2004/0073701 A1 | 4/2004 | Huang et al. |
| 2004/0093419 A1 | 5/2004 | Weihl et al. |
| 2004/0103315 A1 | 5/2004 | Cooper et al. |
| 2004/0128499 A1 | 7/2004 | Peterka et al. |
| 2004/0177247 A1 * | 9/2004 | Peles | 713/155 |
| 2004/0193691 A1 | 9/2004 | Chang |
| 2004/0210767 A1 | 10/2004 | Sinclair et al. |
| 2004/0254921 A1 | 12/2004 | Cohen |
| 2004/0255166 A1 | 12/2004 | Shimizu |
| 2004/0255167 A1 | 12/2004 | Knight |
| 2005/0010821 A1 | 1/2005 | Cooper et al. |
| 2005/0102535 A1 | 5/2005 | Patrick et al. |
| 2005/0160161 A1 | 7/2005 | Barrett et al. |
| 2005/0177869 A1 | 8/2005 | Savage et al. |
| 2005/0195854 A1 | 9/2005 | Agmon et al. |
| 2005/0216421 A1 | 9/2005 | Barry et al. |
| 2005/0216572 A1 | 9/2005 | Tso et al. |
| 2006/0015645 A1 | 1/2006 | Ocko |
| 2006/0026683 A1 | 2/2006 | Lim |
| 2006/0031938 A1 | 2/2006 | Choi |
| 2006/0069912 A1 | 3/2006 | Zheng et al. |
| 2006/0075467 A1 | 4/2006 | Sanda et al. |
| 2006/0107036 A1 | 5/2006 | Randle et al. |
| 2006/0230265 A1 * | 10/2006 | Krishna | 713/158 |
| 2007/0033641 A1 | 2/2007 | Chu |
| 2007/0067847 A1 | 3/2007 | Wiemer et al. |
| 2007/0118879 A1 | 5/2007 | Yeun et al. |
| 2007/0130457 A1 | 6/2007 | Kamat |
| 2007/0150934 A1 | 6/2007 | Fiszman et al. |
| 2007/0194097 A1 | 8/2007 | Jones |
| 2007/0198432 A1 | 8/2007 | Pitroda et al. |
| 2007/0208936 A1 | 9/2007 | Ramos |
| 2007/0223462 A1 | 9/2007 | Hite et al. |
| 2007/0250920 A1 | 10/2007 | Lindsay |
| 2007/0283416 A1 | 12/2007 | Renaud |
| 2007/0294749 A1 | 12/2007 | Nice et al. |
| 2008/0005780 A1 | 1/2008 | Singleton |
| 2008/0016232 A1 | 1/2008 | Yared et al. |
| 2008/0028445 A1 | 1/2008 | Dubuc et al. |
| 2008/0034425 A1 | 2/2008 | Overcash et al. |
| 2008/0052771 A1 | 2/2008 | Demond et al. |
| 2008/0072301 A1 | 3/2008 | Chia et al. |
| 2008/0123854 A1 | 5/2008 | Peel et al. |
| 2008/0127333 A1 | 5/2008 | Gabriel |
| 2008/0159313 A1 | 7/2008 | Rasanen |
| 2008/0229385 A1 | 9/2008 | Feder et al. |
| 2009/0019156 A1 | 1/2009 | Mo et al. |
| 2009/0086742 A1 | 4/2009 | Ghai et al. |
| 2009/0177514 A1 | 7/2009 | Hudis |
| 2009/0178108 A1 | 7/2009 | Hudis |
| 2009/0178109 A1 | 7/2009 | Nice et al. |
| 2009/0178131 A1 | 7/2009 | Hudis |
| 2009/0178132 A1 | 7/2009 | Hudis |
| 2010/0106599 A1 | 4/2010 | Kohn et al. |

FOREIGN PATENT DOCUMENTS

| | | |
|---|---|---|
| CN | 1581771 A | 2/2005 |
| CN | 101064604 | 10/2007 |
| JP | 2004355073 | 12/2004 |
| JP | 200511098 | 1/2005 |
| JP | 2005184463 | 7/2005 |
| JP | 2006526184 | 11/2006 |
| JP | 2007164661 | 6/2007 |
| JP | 2007241717 | 9/2007 |
| JP | 2007299259 | 11/2007 |
| JP | 2008003745 | 1/2008 |
| JP | 2008083937 | 4/2008 |

OTHER PUBLICATIONS

International Search Report and Written Opinion Received for PCT Application No. PCT/US2009/038673, mailed on Nov. 27, 2009, 11 pages.

"Identity Management Solutions", 1994-2008, Sun Microsystems, Inc., pp. 2.

"Entrust GetAccess Named as Approved E-Authentication Solution for Government Web Portal Applications", Entrust Inc., pp. 2.

Warnock, et al., "The GridAuth Credential Management System", ACM, 2005, pp. 6.

"Security and Authentication in Content Management Server", Microsoft Corporation, 2008, pp. 13.

"Secure Enterprise Content Management for Government Agencies", 2005, EMC Corporation, pp. 2.

"Remote Authentication Dial in User Service", retrieved at <<http://en.wikipedia.org/wiki/RADIUS>>, pp. 6.

"Mutual Authentication", retrieved at <<http://en.wikipedia.org/wiki/Mutual_authentication, pp. 2.

U.S. Appl. No. 61/019,739, filed Jan. 8, 2008, pp. 1-49.

Non-Final Rejection, U.S. Appl. No. 12/193,070, dated Mar. 28, 2011, pp. 1-20.

Non-Final Rejection, U.S. Appl. No. 12/192,113, dated Apr. 14, 2011, pp. 1-20.

"Content Management Solutions", retrieved at <<http://www.netrust.com.sg/products_contentmgmt.html>>, Jun. 5, 2008, p. 1.

"On-demand Web security service", Jan. 30, 2007, pp. 1-4, Copyright SurfControl plc.

"Global Content Management Solution", retrieved at <<http://www.rsd.com/en/global-content-management.html, Jan. 31, 2008 pp. 1-2.

Zitzlsberger, "Security of Content Management Systems Principles of Secure Development and Administration", retrieved at <<http://cms.hs-augsburg.de/report/2004/Zitzlsberger_Georg/security_of_cms.pdf>>, Jul. 9, 2004, pp. 1-9.

"Leveraging Two-Factor Authentication to Provide Secure Access to Corporate Resources from Blackberry Devices", White Paper, retrieved at <<http://ww.rsaconference.com/uploadfiles/RSA365/Security_Topics/Wireless/White_Papers/RSA/RSA_Authentication_Blackberry_Devices.pdf>>, downloaded Jun. 4, 2008, pp. 1-8.

Hausheer et al., "Design of a Distributed P2P-based Content Management Middleware", retrieved at http://www.tik.ee.ethz.ch/~mmapps.org/papers/euromicro03-camera-ready.pdf>>, downloaded Jun. 4, 2008, pp. 1-8.

(56) References Cited

OTHER PUBLICATIONS

Burke et al., "Secure Content Management Market Definition", IDC, vol. 1, Sep. 2005, pp. 1-8.
"Policy.Net: Policy Based Network Traffic Management", Net Veda LLC, 2003-2005, pp. 1-24.
"Introducing Stirling—Walkthroughs", Microsoft Forefront System Security, retrieved at <<http://technet.microsoft.com/en-us/library/cc441338.aspx>>, May 12, 2008, p. 1.
"Configuring Stirling to Work with Forefront Threat Management Gateway", retrieved at <<http://www.google.co.in/search?hl=en&q=Configuring+Stirling+to+Work+with+Forefront+Threat+Management+Gateway&btnG=Google+Search&meta=>>, Microsoft Corporation, 2008, pp. 1-6.
"Comprehensive Computer Network Security Assessment", Tech Genix Ltd., Published Oct. 16, 2002, pp. 1-12.
"Information Security—Network Assessment", White Paper, Computer Technology Associates, Inc., Published Mar. 2002, pp. 1-12.
"HP Assessment Management Platform Software", Hewlett-Packard Development Company, retrieved at <<http://h10078.www1.hp.com/cda/hpms/display/main/hpms_content.jsp . . . >>, Copyright 2008, p. 1.
Non-Final Rejection, U.S. Appl. No. 12/192,107, dated Jun. 20, 2011, pp. 1-16.
Chinese Patent Application No. 200980120235.1, Response to Second Office Action dated Jul. 10, 2013 , 5 pages (including English translation).
Chinese Patent Application No. 200980120235.1, Office Action dated Oct. 9, 2012, 11 pages (including English translation).
Japanese Patent Application No. 2011-511664, Notice of Rejection dated Jul. 2, 2013, 4 pages.
U.S. Appl. No. 12/164,078, Non-Final Rejection mailed Sep. 2, 2011, 10 pages.
U.S. Appl. No. 12/164,078, Amendment filed Dec. 2, 2011, 9 pages.
U.S. Appl. No. 12/192,111, Non-Final Rejection mailed Jun. 30, 2011, 16 pages.
U.S. Appl. No. 12/192,111, Amendment filed Oct. 31, 2011, 14 pages.
U.S. Appl. No. 12/193,070, Amendment filed Aug. 29, 2011, 11 pages.
U.S. Appl. No. 12/193,070, Final Rejection mailed Dec. 5, 2011, 20 pages.
U.S. Appl. No. 12/192,113, Amendment filed Aug. 15, 2011, 8 pages.
U.S. Appl. No. 12/192,113, Final Rejection mailed Nov. 10, 2011, 9 pages.
U.S. Appl. No. 12/192,107, Amendment mailed Oct. 20, 2011, 13 pages.
Chinese Patent Application No. 200980120235.1, Second Office Action dated May 9, 2013, 12 pages (including English translation).
English Translation of Abstract of CN 101064604, 1 page.
Chinese Patent Application No. 200980120235.1, Third Office Action dated Oct. 18, 2013, 14 pages (including English translation).
English Translation of Abstract of JP2005-11098, 1 page.
Chinese Patent Application No. 200980120235.1, Amendment dated Office Action dated Feb. 5, 2013, 14 pages (including English translation of claims).
U.S. Appl. No. 12/164,078, Final Office Action dated Dec. 14, 2011, 10 pages.
U.S. Appl. No. 12/164,078, Amendment After Final Office Action dated Mar. 1, 2012, 8 pages.
U.S. Appl. No. 12/192,107, Office Action dated Mar. 29, 2012, 13 pages.
U.S. Appl. No. 12/192,107, Amendment dated Jul. 30, 2012, 13 pages.
U.S. Appl. No. 12/192,107, Final Office Action dated Aug. 28, 2012, 17 pages.
U.S. Appl. No. 12/192,107, Amendment After Final Office Action dated Nov. 28, 2012, 13 pages.
U.S. Appl. No. 12/192,111, Office Action dated Apr. 13, 2012, 16 pages.
U.S. Appl. No. 12/192,111, Amendment dated Jul. 13, 2012, 14 pages.
U.S. Appl. No. 12/192,111, Final Office Action dated Aug. 28, 2012, 20 pages.
U.S. Appl. No. 12/192,111, Amendment After Final Office Action dated Nov. 28, 2012, 11 pages.
U.S. Appl. No. 12/193,070, Amendment After Final Office Action dated Mar. 5, 2012, 10 pages.
U.S. Appl. No. 12/192,113, Amendment After Final Office Action dated Feb. 10, 2012, 8 pages.
U.S. Appl. No. 12/192,113, Notice of Allowance dated Mar. 27, 2012, 8 pages.
U.S. Appl. No. 12/192,113, Notice of Allowance dated Jun. 13, 2012, 7 pages.
Chinese Patent Application No. 200980120235.1, Fourth Office Action dated Apr. 19, 2014, 14 pages (including English translation).
Abstract of CN1540944A, 1 page.
Japanese Patent Application No. 2011-511664, Notice of Allowance dated Apr. 1, 2014, 3 pages.
U.S. Appl. No. 12/164,078, Office Action dated May 5, 2014, 11 pages.
U.S. Appl. No. 12/193,070, Office Action dated Apr. 3, 2014, 17 pages.
Chinese Patent Application No. 200980120235.1, Amendment dated Fourth Office Action dated Jul. 14, 2014, 13 pages (including English translation of claim amendments
U.S. Appl. No. 12/192,111, Notice of Allowance dated Jul. 2, 2014, 14 pages.
U.S. Appl. No. 12/193,070, Amendment dated Jul. 3, 2014, 10 pages.
Japanese Patent Application No. 2011-511664, Letters Patent issue date May 9, 2014, 3 pages.
Japanese Patent Application No. 2011-511664, Amendment dated Nov. 1, 2013, 6 pages, including English translation of claims.
Chinese Patent Application No. 200980120235.1, Amendment dated Third Office Action dated Jan. 2, 2014, 3 pages (including English translation).
U.S. Appl. No. 12/193,070, Non-Final Rejection dated Mar. 7, 2013, 20 pages.
U.S. Appl. No. 12/193,070, Amendment dated Jun. 7, 2013, 10 pages.
U.S. Appl. No. 12/193,070, Final Rejection dated Sep. 13, 2013, 21 pages.
U.S. Appl. No. 12/193,070, Amendment After Final Rejection dated Jan. 13, 2014, 10 pages.
Chappell, David, "A Short Introduction to Cloud Platforms", Microsoft Corporation, 2008, 13 pages.

\* cited by examiner

AUTHENTICATION FOR DISTRIBUTED SECURE CONTENT MANAGEMENT SYSTEM

BACKGROUND

Traditionally, enterprises have employed functionality included in various security products and appliances to protect company information technology assets. Such functionality may include, for example, filtering network traffic into and out of the enterprise for malicious code such as malware, limiting access to inappropriate external content, preventing attacks and other intrusions on the enterprise network, and so forth.

With the widespread availability of mobile, home, and other computing devices, employees have taken work to locations outside the corporate network. To obtain the same level of protection and to enforce policies as provided on the enterprise network, some enterprises have required such employees to log on to or otherwise access the enterprise network and to access resources outside of the enterprise network through the enterprise network. For various reasons, this becomes non-optimal when a roaming user is not close to the enterprise network.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to authentication for a distributed secure content management system. In aspects, a request to access a resource available through the Internet is routed to a security component. The security component is one of a plurality of security components distributed throughout the Internet and responsible for authenticating entities associated with an enterprise. The security component determines an authentication protocol to use with the entity and then authenticates the entity. If the entity is authenticated, the entity is allowed to use a forward proxy.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
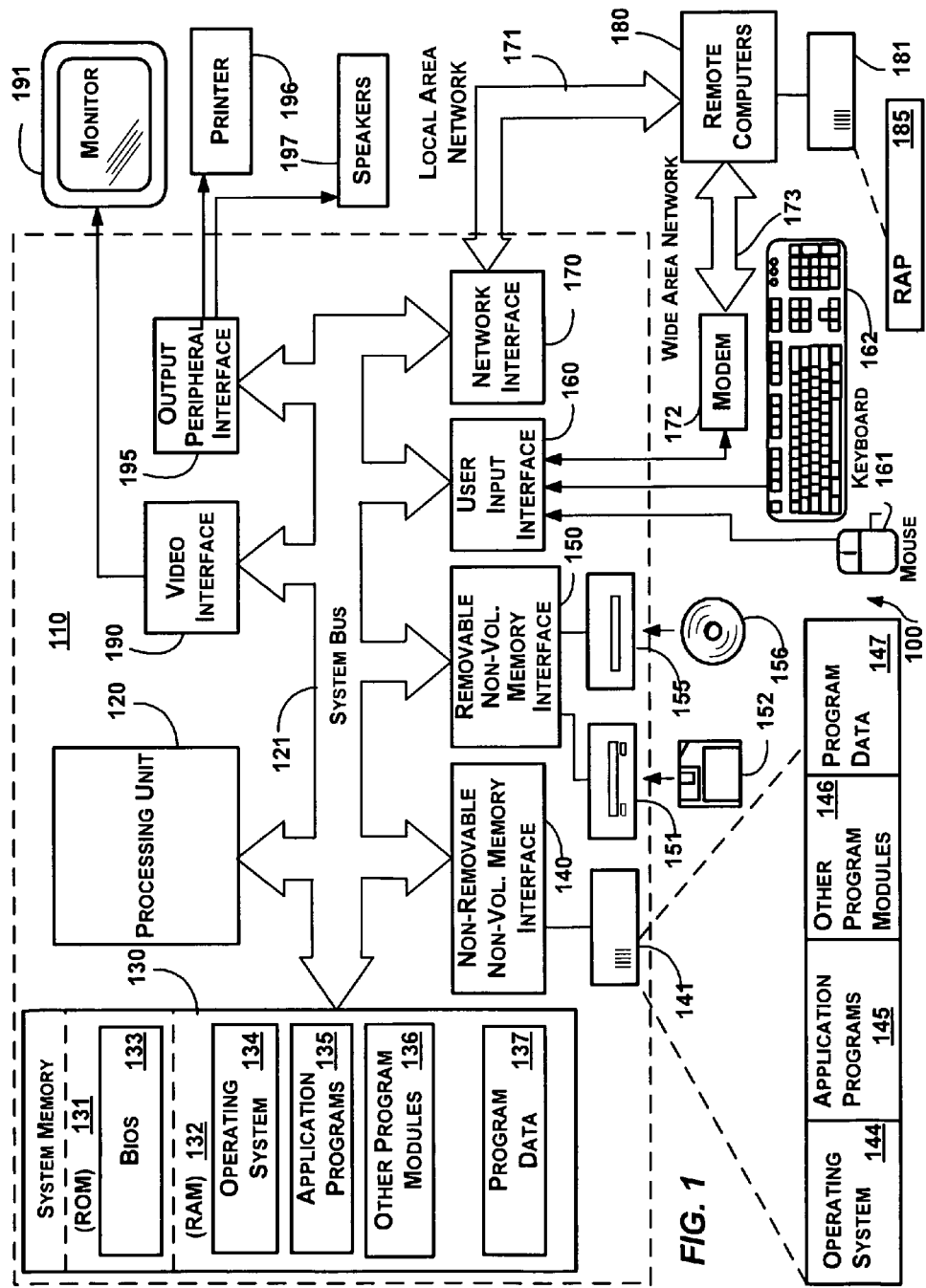
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Authentication

As mentioned previously, employees often work outside of a business network. At the same time, however, a business would like to be able to provide the same level of protection, provide reports based on user activity, and to apply the same policies as are applied when the user uses the business network to access remote network resources.

In accordance with aspects of the subject matter described herein, there are provided one or more forward proxies that are located in the cloud. Logically, a forward proxy sits between a client and a network resource the client is attempting to access. A forward proxy receives requests from a client, provides connectivity to the client to resources requested, and may provide other functions identified above, as appropriate, to these requests. A forward proxy may be associated with one or more security components that authenticate entities and log activity associated therewith. These components may authenticate an entity using a variety of authentication protocols and may communicate with an identity system located at an enterprise site to perform this authentication. The components may also obtain an identifier to use in logging entity activity.

Being associated with a security component means that the forward proxy may include all or a portion of the security component or that all or a portion of the security component may be located outside of the forward proxy.

Figure 2:
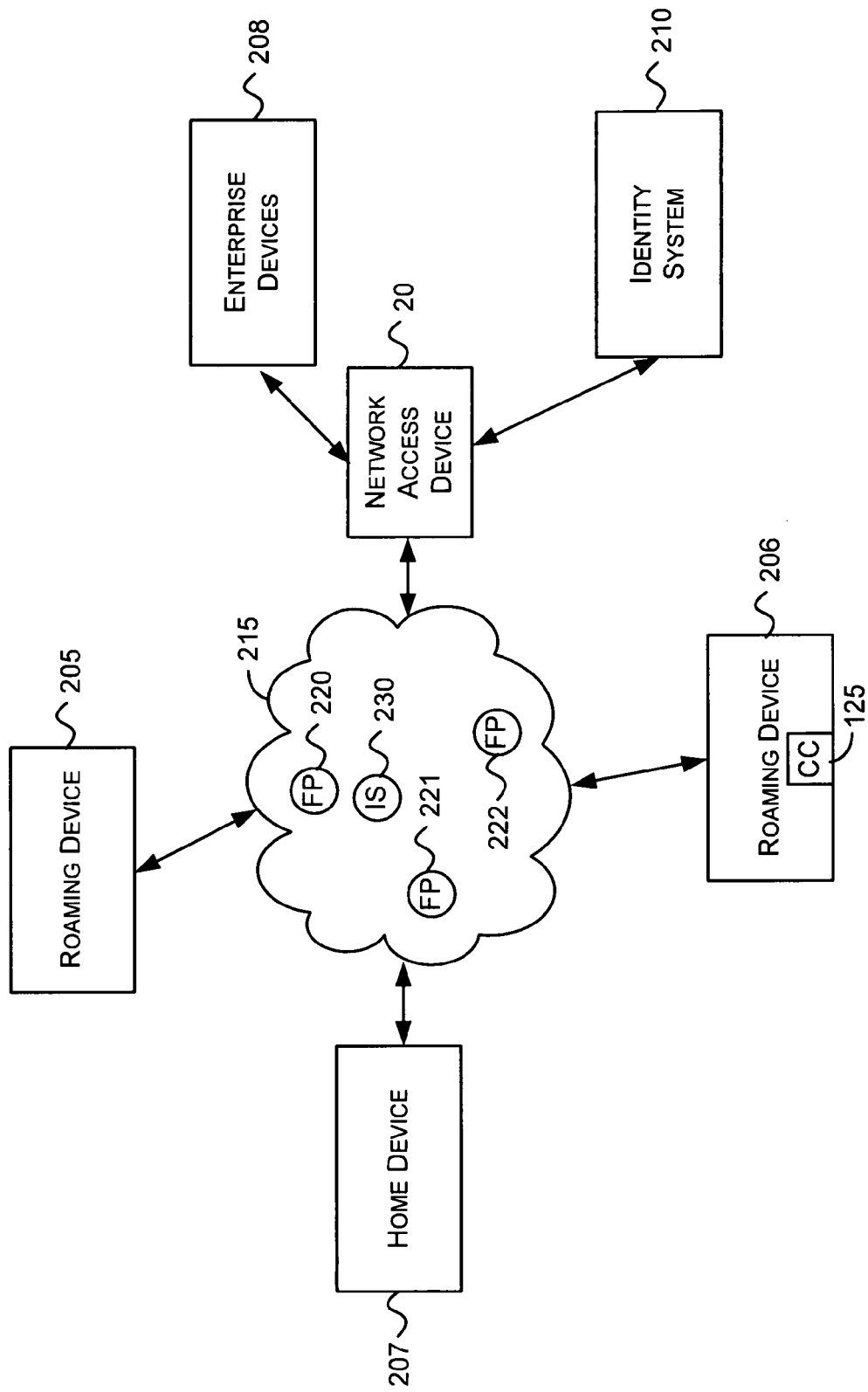
FIG. 2 is a block diagram that generally represents an exemplary environment in which aspects of the subject matter described herein may be implemented.

FIG. 2 is a block diagram that generally represents an exemplary environment in which aspects of the subject matter described herein may be implemented. The environment illustrated in FIG. 2 may include roaming devices 205-206, a home device 207, enterprise devices 208, a network access device 209, and an identity system 210 (hereinafter sometimes collectively referred to as the entities) and may include other entities (not shown). The various entities may communicate via various networks including intra- and inter-office networks and the network 215.

In an embodiment, the network 215 may comprise the Internet. In an embodiment, the network 215 may comprise one or more local area networks, wide area networks, direct connections, some combination of the above, and the like.

The devices 205-208 may comprise one or more general or special purpose computing devices. Such devices may include, for example, personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one or more of the devices 205-208 comprises the computer 110 of FIG. 1.

The roaming devices 205-206 may comprise computing devices that are taken from location to location. For example, an employee may take a notebook computer on a business trip. As another example, an employee may travel with a cell phone, PDA, or some other handheld device which the employee may use almost anywhere.

The home device 207 may comprise, for example, a personal computer or other electronic device located at an employee's home.

The enterprise devices 208 may comprise devices that are located at one or more business sites and connected to a business network. For example, the enterprise devices 208 may include workstations, servers, routers, mobile devices, and other of the general and special purpose computing devices mentioned previously.

The network access device 209 may comprise one or more devices and/or software components configured to permit, deny, proxy, transmit, cache, or perform other actions on computer traffic. Configured as a firewall, the network access device 209 may act to provide protection to the enterprise devices 208 and the identity system 210 and other devices, if any, connected behind the network access device 209. The network access device 209 may be configured as an endpoint to a virtual private network. In such a configuration, the network access device 209 may provide a secure communication channel to one or more of the forward proxies 220-222 as well as to other components attached to the network 215, such as the local identity system 230. A secure communication channel with the local identity system 230 may be used to establish one way or two way trust relationship between the identity system 210 and the local identity system 230. In one embodiment, the network access device 209 may comprise, for example, the computer 110 of FIG. 1 configured with the appropriate hardware and software. In another embodiment, the network access device 209 may comprise a special purpose appliance.

The identity system 210 may comprise one or more processes hosted on one or more devices such as the devices mentioned above. The identity system 210 may be utilized to identify users and/or devices as will be described in more detail below. In one embodiment, the identity system 210 may comprise an Active Directory produced by Microsoft Corporation of Redmond, Wash. Other examples of identity systems include RADIUS based ID systems, LDAP based ID systems, generic database ID systems, and the like.

As illustrated in FIG. 2, in one embodiment, the identity system 210 resides on an enterprise network accessible through the network access device 209. In another embodiment, the identity system 210 may reside on a network external to an enterprise's network. For example, the identity system 210 may reside or be distributed at various locations within the network 215. In one embodiment, the identity system 210 may be a service hosted by a server attached to the network 215.

Forward proxies 220-222 are located at various locations accessible via the network. These forward proxies may provide various functions such as connectivity, anti-virus, spyware, and phishing protection, URL filtering, firewall, intrusion detection, information leakage prevention (ILP), and the like that are sometimes provided by devices in an enterprise network. The forward proxies 220-222 may also provide centralized management to roaming devices connected to the network 215. The forward proxies 220-220 may also provide other functions to various devices, such as rendering for mobile devices, caching of Web pages and other content, and any other connectivity and/or security functions that may be desired by an enterprise.

When a device attempts to access a resource connected to the network 215, traffic to and from the device may be routed to a forward proxy to provide one or more of the functions described above, for example. Before a device is provided these functions, however, a security component associated with the forward proxy authenticates the device and/or a user using the device. In the context of authentication, the term entity is sometimes used herein to indicate a device and/or a user using the device.

Authenticating an entity may be done for various reasons. For example, it may be desired that only registered entities be allowed to use the forward proxy. To ensure that this occurs, authentication may be performed. As another example, authenticating an entity may be used for identification to know what policies to apply to traffic routed to and from the device. As yet another example, authenticating an entity may be used for reporting, auditing, and otherwise tracking activities of the entity.

The example reasons for authenticating an entity mentioned above are not intended to be all-inclusive or exhaustive. Neither is it intended to limit aspects of the subject matter described herein to implementations that involve one or more of the examples above. Indeed, based on the teachings herein, those skilled in the art may recognize many other scenarios in which concepts presented herein may be applied without departing from the spirit or scope of aspect of the subject matter described herein.

In authenticating an entity based on enterprise credentials, information from the identity system 210 may be transmitted to a security component that is attempting to authenticate an entity. In one embodiment, a security component may not maintain its own database of credentials for entities that are authorized to use the forward proxy. Instead, credentials may be stored at an enterprise-controlled location such as on a credentials database accessible via the identity system 210. This may be done for various reasons. For example, with no credentials databases in the cloud, the system can avoid maintaining and synchronizing credential databases stored in the cloud and credential databases stored on an enterprise network. Also, as a cloud credential database may be controlled by a party other than the enterprise, having the credential database stored on the enterprise network may pose less of a security risk. As another benefit, new entities that are recently created on the enterprise network may immediately access the forward proxy as these entities do not need to wait for synchronization. In addition, entities that are no longer allowed to access a forward proxy may be immediately denied access to a forward proxy by removing their credentials from the credential database. Furthermore, reports generated regarding network activity of an entity can track the entity regardless of the location from which the entity accesses a forward proxy.

In this embodiment, to authenticate an entity, a security component may communicate as needed with the identity system 210 to obtain enough information to authenticate the entity. Such information may include, for example, the entity credentials, challenge/response data, certificate-related information, or any other information usable to authenticate the entity.

In another embodiment, a security component may have access to a local identity system 230 that is synchronized with the identity system 210 using a one-way or two-way trust relationship. In a one-way trust relationship, entities that are authenticated using the enterprise credentials synchronized to the local identity system 230 are allowed to access resources via a forward proxy.

Communication between a security component and the identity systems 210 and 230 may be done in a variety of ways, including, for example, a virtual private network (VPN), Multi Protocol Label Switching (MPLS), Internet Protocol security (IPSec), Internet Protocol version 6 (IPv6) global addressing, other communication protocols, and the like.

In one embodiment, only the port(s) needed by the particular communication protocol may be involved in a virtual private network between an identity system and a security component. In other words, messages to ports that are involved in the communication protocol may be forwarded, while messages to ports that are not involved in the communication protocol may not be forwarded. This may assist in maintaining the security of the enterprise network as the attack surface (e.g., number of ports forwarded) may be greatly reduced.

The forward proxies and the identity systems may be configured to communicate via IPv6. In conjunction with IPsec and configured policy, this may be used to guarantee that only specified forward proxies are allowed to communicate with the identity systems.

To authenticate an entity, a security component associated with a forward proxy may use one or more of many different mechanisms. For example, a virtual private network (VPN) may be established between a security component and a device. In such a configuration, that the VPN was successfully established may serve to authenticate an entity. As other examples, Integrated Windows® authentication, IPSec, form based authentication, RADIUS, MPLS, Basic access authentication, Kerberos, client certificate based authentication, some other authentication protocols, or the like may be used to authenticate an entity. In one embodiment, an authentication may be initiated as part of an HTTP proxy authentication.

The type of authentication protocol may be negotiated between a security component and the device. For example, if a device supports a first set of authentication protocols and a security component supports a second set of authentication protocols, an authentication protocol that both the device and the security component support may be selected to authenticate the entity. As another example, if the device supports an authentication protocol that allows the device to authenticate itself and/or a user without user interaction (e.g., such as Integrated Windows® Authentication), this protocol may be selected.

There are many ways to authenticate an entity. For example, to authenticate an entity, a security component may ask for the entity credentials (e.g., username and password or other credentials associated with the entity). Using these credentials, the security component may communicate with the identity system 210 to verify the credentials. To do this, the entity may use Basic, form, RADIUS, or some other authentication protocol, for example.

If the credentials are valid, the identity system 210 may indicate this to the security component and send an identifier associated with the entity to the security component. This identifier may comprise an enterprise identity of the entity. This identifier may be used in logging subsequent activity by the entity.

As another example to authenticate an entity, a security component may authenticate credentials without receiving the credentials. For example, the security component may provide a challenge to the entity and may use the response to the challenge to authenticate the entity. The security component may involve the identity system 210 in determining a challenge and/or validating a response to a challenge.

As another example, a security component may be associated with a local identity system 230 that is synchronized with the identity system 210 using a one-way or two-way trust relationship. The security component may utilize the local identity system 230 to authenticate an entity.

As another example, secure socket layer (SSL) and/or transport layer security (TLS) capabilities may be added to the proxy capabilities defined in the HTTP protocol. The current HTTP protocols for HTTP proxies do not provide for using SSL or TLS in an HTTP proxy. An HTTP proxy may be enhanced to use SSL and/or TLS when communicating with a client. SSL/TLS may also be used for mutual authentication. As part of the establishment of a connection, the client may be authenticated via SSL or TLS. In this authentication method, the security component may authenticate the client, for example, by verifying that the client certificate is signed by a trusted Certificate Authority. Adding SSL/TLS to an HTTP proxy may also enable secure (e.g., encrypted) communication between an end-point and the forward proxy.

In one embodiment, after the first authentication between a client and a security component, a cookie may be provided to the client to use with subsequent requests. The current HTTP protocol allows for a target server to provide a cookie to a client but does not allow an HTTP proxy to independently generate and supply a cookie to the client. Furthermore, in the current HTTP protocol, the client is to provide the cookie only when communicating with the target server that sent the cookie to the client.

When a forward proxy functions as an HTTP proxy, the forward proxy (or a security component associated therewith) may generate and send the client a cookie after the client has been authenticated. In subsequent requests, the client may then send this cookie to the forward proxy (or a security component associated therewith) that provided the cookie to the client or to another forward proxy. The client may also send this cookie even when the client seeks to access a resource on a different target server.

When the client sends the cookie in a subsequent request, the forward proxy (or a security component associated therewith) may examine the cookie to determine that the client is already authenticated. This may avoid overhead associated with re-authenticating with each request received from the client. The cookie may be configured with a time to live parameter such that it expires after a set time.

A cookie as used herein includes any data that may be used to verify that an entity has been already been authenticated. For example, a cookie may include an identifier that may be used by a security component to access a record of a database. The record may indicate whether the entity has been authenticated. As another example, a cookie may include encrypted information that the security component is capable of decrypting to determine whether the entity has been authenticated.

A cookie may also include other data regarding an entity. For example, a cookie may include an identifier associated with the entity. This identifier may correspond to an identifier the entity uses when accessing an enterprise network, for example. This identifier may be used when logging entity activity. As another example, the cookie may include policy information associated with the entity. For example, the cookie may include information that indicates what sites the entity is allowed to access.

Another mechanism that may be used to authenticate an entity is via a connection component (e.g., the connection component 125). A connection component is a component that resides on a device and that monitors connections from the device. For example, a connection component may monitor TCP traffic sent to and from a device. When the connection component sees a connection request that is to be routed to a forward proxy, the connection component may authenticate with a security component associated with the forward proxy and encrypt the connection. This may be done in such a way as to be transparent to the user using the device. When the user enters a request (e.g., a URL request) that needs to be routed through a forward proxy, the connection component may authenticate with a security component associated with the forward proxy and then forward the request to the forward proxy over a secure channel.

In one embodiment, when a cookie is provided to an entity for use in authentication in subsequent requests, a connection component may handle the cookie and provide it in subsequent requests. In another embodiment, when a cookie is provided to an entity for use in authentication in subsequent requests, the connection component may allow the entity to handle the cookie and to provide the cookie in subsequent requests.

Although examples of some mechanisms for authenticating an entity have been provided above, these examples are not intended to be all-inclusive or exhaustive. Indeed, aspects of the subject matter described herein are not limited to the authentication method as virtually any authentication method, existing or to be developed, may be employed without departing from the spirit or scope of aspects of the subject matter described herein.

As a result of authentication process, an identifier may be obtained that may then used for logging, auditing, applying policy, and the like. This identifier may be provided by the identity system 210, by the local identity system 230, or by some other component without departing from aspects of the subject matter described herein. The identifier may by the same identifier used to identify the entity to an enterprise network associated with the entity.

Although the environment described above includes various numbers of each of the entities and related infrastructure, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
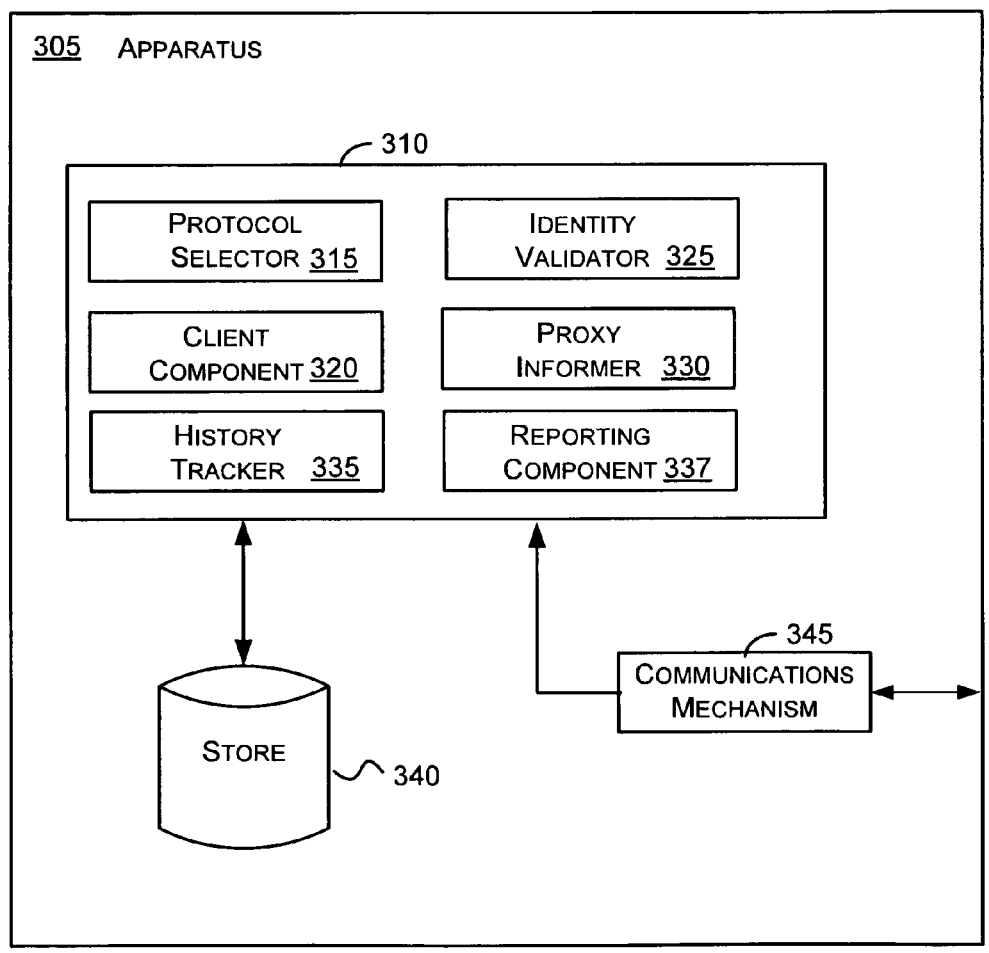
FIG. 3 is a block diagram that represents an exemplary apparatus configured with security components in accordance with aspects of the subject matter described herein.

FIG. 3 is a block diagram that represents an exemplary apparatus configured with security components in accordance with aspects of the subject matter described herein. The components illustrated in FIG. 3 are exemplary and are not meant to be all-inclusive of components that may be needed or included. In other embodiments, the components or functions described in conjunction with FIG. 3 may be included in other components or placed in subcomponents without departing from the spirit or scope of aspects of the subject matter described herein. In some embodiments, the components or functions described in conjunction with FIG. 3 may be distributed across multiple devices that are accessible to the apparatus 305.

Turning to FIG. 3, the apparatus 305 may include security components 310, a store 340, and communications mechanism 345. The security components 310 may include a protocol selector 315, a client component 320, an identity validator 325, a proxy informer 330, a history tracker 335, and a reporting component 337. The security components 310 may be associated with the forward proxies described in conjunction with FIG. 1. Associated with context means included on the same device, located on one or more devices that do not host a forward proxy but can communicate with a forward proxy, and the like.

The communications mechanism 345 allows the apparatus 305 to communicate with other entities as shown in FIG. 2. The communications mechanism 345 may be a network interface or adapter 170, modem 172, or any other mechanism for establishing communications as described in conjunction with FIG. 1.

The store 340 is any storage media capable of storing history information regarding activities engaged in by entities. The store 340 may comprise a file system, database, volatile memory such as RAM, other storage, some combination of the above, and the like and may be distributed across multiple devices. The store 340 may be external or internal to the apparatus 305.

The protocol selector 315 is operable to determine an authentication protocol to utilize in conjunction with authenticating an entity seeking to gain access to a resource available via a first network. For example, referring to FIG. 2, a protocol selector may determine an authentication protocol to use to authenticate one of the devices 205-208 when these devices seek to access a resource accessible via the network 215.

The client component 320 is operable to authenticate an entity using the authentication protocol determined by the protocol selector 315. The entity may comprise a user using the device and/or the device. For example, referring to FIG. 2, a client component may use mutual TLS protocol to authenticate a user using the roaming device 205.

The identity validator 325 is operable to obtain an identifier associated with the entity from an identity system. The identity system may be located on a local network or network external to the client component 320 as previously indicated. The identity system may have access to a database that includes identifiers for entities that are associated with an enterprise that controls this network (e.g., an enterprise network) that is external to the client component 320. For example, referring to FIG. 2, an identity validator may communicate with the identity system 210 to obtain the identifier.

The proxy informer 330 is operable to indicate to a forward proxy whether an entity is authenticated based on results obtained from the client component 320. For example, referring to FIG. 2, a proxy informer may indicate to one of the forward proxies 220-222 that an entity is authenticated to use the security functions provided by the forward proxy.

The history tracker 335 is operable to store information identifying an entity and resources accessed by the entity. For example, referring to FIG. 2, a history tracker may store a username with each URL sent to the forward proxy 220 by the user using the roaming device 205. The history tracker 335 may utilize the store 340 to store history information.

The reporting component 337 is operable to provide the history information in a form that identifies the entity and the resources (e.g., URLs, network addresses, and so forth) accessed by the entity. This form may include a username or other identifier together with a resource identifier. Because the information includes enough information to identify an entity on the enterprise, if the device becomes contaminated (e.g., via malware), when the user brings the device to the enterprise network, a report may indicate that the device has been contaminated and needs to be cleaned before being allowed to access the corporate network.

Figure 4:
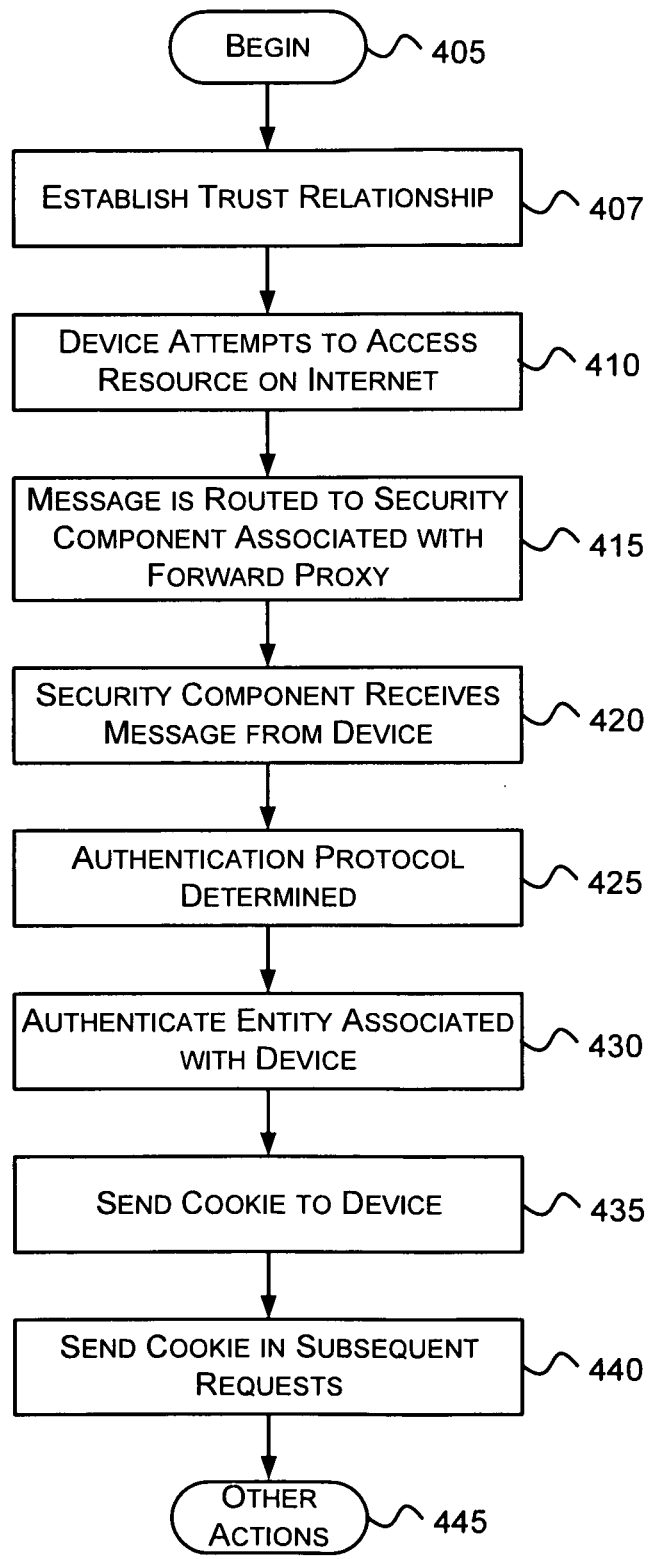
FIGS. 4-5 are flow diagrams that generally represent actions that may occur in conjunction with authentication in accordance with aspects of the subject matter described herein.
Figure 5:
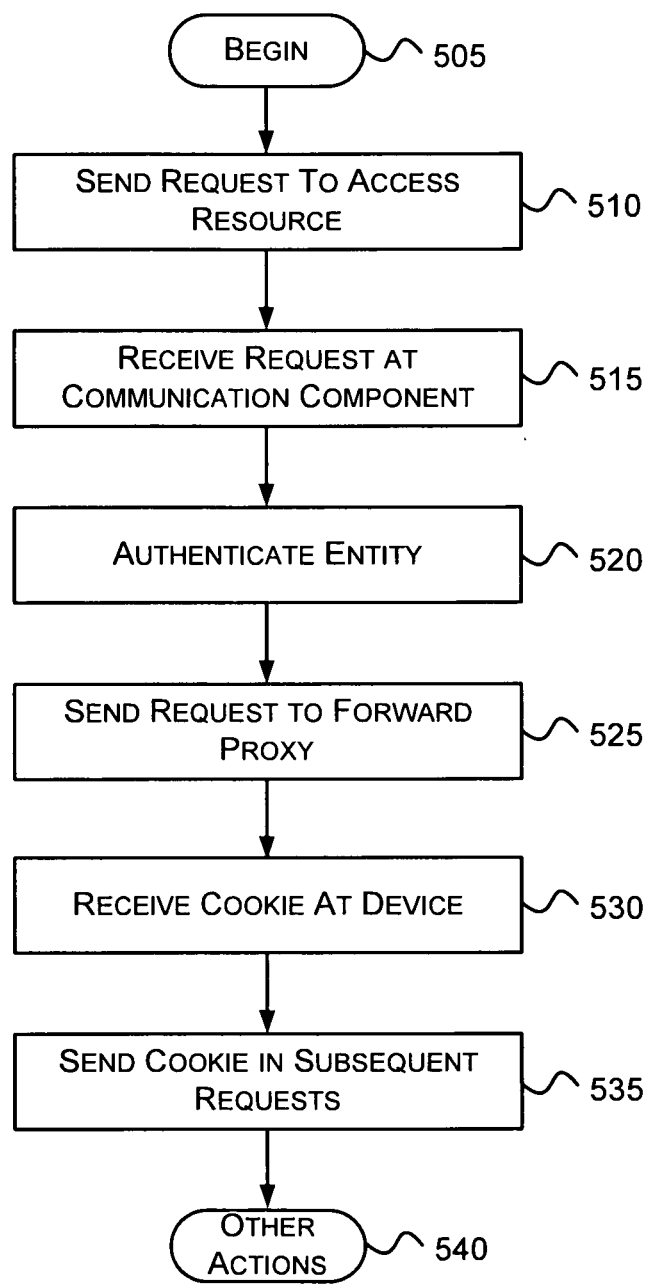

FIGS. 4-5 are flow diagrams that generally represent actions that may occur in conjunction with authentication in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 4, at block 405, the actions begin. At block 407, a trust relationship may be established. For example, referring to FIG. 2, the local identity system 230 may establish a trust relationship with the enterprise identity system 210. At block 410 a device attempts to access a resource on a network external to the device (e.g., the Internet). For example, referring to FIG. 2, the roaming device 206 attempts to access a resource (e.g., a Web page) available via the network 215.

At block 415, the request is routed to a security component associated with a forward proxy. For example, referring to FIG. 2, the connection component 125 routes the request to a security component associated with the forward proxy 222.

At block 420, the security component receives the message from the device. For example, referring to FIG. 3, the security component 310 receives the request.

At block 425, an authentication protocol by which an entity associated with the device is to be authenticated is determined. For example, referring to FIG. 310, the protocol selector 315 determines an authentication protocol to use in authenticating the user associated with the roaming device 206 of FIG. 2.

At block 430, the security component authenticates an entity associated with the device. For example, referring to FIGS. 2 and 3, the client component 320 authenticates a user associated with the roaming device 206.

At block 435, when cookies are used, a cookie is sent to the device to use in subsequent requests. For example, referring to FIG. 2, a security component associated with the forward proxy 222 sends a cookie to the roaming device 206.

At block 440, the device sends the cookie in subsequent requests. For example, referring to FIG. 2, the roaming device 206 sends the cookie it received in subsequent requests for resources accessible via the network 215.

At block 445, other actions, if any, may occur. For example, periodically, the entity may be re-authenticated.

Turning to FIG. 5, at block 505, the actions begin. At block 510, a request to access a resource on a second network is sent from an entity associated with a device attached to a first network. For example, referring to FIG. 2, a request to access a resource accessible via the network 215 is sent from an entity associated with the device 206.

At block 515, the request is received at a communication component. For example, referring to FIG. 2, the communication component 125 receives the request.

At block 520, the entity is authenticated via the communication component. For example, referring to FIG. 2, the communication component 125 communicates with a security component associated with the forward proxy 222 to authenticate a user using the device 206.

At block 525, the request is sent to a forward proxy. For example, referring to FIG. 2, the request from the device 206 is sent to the forward proxy 222.

At block 530, a cookie may be received at the device. The cookie indicates that the entity has been previously authenticated by the security component. This may occur, for example, to speed subsequent authentications.

At block 535, the cookie is sent in subsequent requests. For example, referring to FIG. 2, the communication component 125 may send the cookie in subsequent requests for resources.

At block 540, other actions, if any, may occur.

As can be seen from the foregoing detailed description, aspects have been described related to authentication in a distributed security content management system. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

receiving, at a security component, a message sent from a device, the security component being associated with a forward proxy that is logically between the device and a resource to which the device seeks access;

authenticating, via the security component, an entity associated with the device;

sending a cookie to the device, the cookie indicating that the entity has been previously authenticated by the security component, the device to present the cookie with subsequent requests for access to resources accessible via the forward proxy, the forward proxy providing connectivity of the device to the resource;

establishing a time to live for the cookie, the cookie being no longer useful for authentication after the time to live has expired, wherein the cookie includes policy information associated with the entity usable to enforce a policy for the subsequent requests, the policy information comprising indication of sites the entity is allowed to access; and storing information identifying the entity.

2. The method of claim 1, wherein the forward proxy operates at least as a HyperText Transfer Protocol (HTTP) proxy and wherein authenticating an entity associated with the device comprises establishing a secure connection between the forward proxy and the device.

3. The method of claim 2, wherein the secure connection comprises a secure socket layer connection.

4. The method of claim 2, wherein the secure connection comprises a transport layer security connection.

5. The method of claim 1, wherein the forward proxy operates at least as a HyperText Transfer Protocol (HTTP) proxy and wherein authenticating an entity associated with the device comprises using a client certificate.

6. The method of claim 1, wherein the cookie indicates an identity associated with the entity, the identity identifying the entity on a network controlled by a business entity associated with the entity associated with the device.

7. The method of claim 6, further comprising storing a history of subsequent requests sent by the device along with an identifier.

8. The method of claim 1, further comprising establishing a trust relationship between a first identity system located on a first network local to the forward proxy and a second identity system on a network external to the first network.

9. The method of claim 8, wherein establishing a trust relationship comprises synchronizing credentials between the first and second identity systems.

10. The method of claim 1, further comprising obtaining an identifier used for the storing information identifying the entity.

11. A computer storage memory having computer-executable instructions, which when executed perform actions, comprising:

sending, from an entity associated with a device attached to a first network, a request to access a resource from a second network;

receiving the request at a component residing on the device, the component monitoring traffic between the device and the second network;

before sending the request to the second network, using a protocol that allows the device to authenticate itself without user interaction, transparent to a user of the device, authenticating the entity via the component by communicating with a security component associated with a forward proxy attached to the second network, the forward proxy being logically between the device and the second network;

sending the request to the forward proxy over a secure channel; and receiving a cookie from the forward proxy, the cookie indicating that the entity has been previously authenticated by the security component.

12. The computer storage memory of claim 11, wherein the forward proxy operates at least as a HyperText Transfer Protocol (HTTP) proxy and wherein authenticating, via the component, an entity associated with the device comprises using a client certificate.

13. The computer storage memory of claim 11, further comprising handling the cookie via the component, wherein handling the cookie comprises storing the cookie and sending the cookie in a subsequent request for a resource that is accessible via the second network.

14. The computer storage memory of claim 11, wherein the entity comprises the device and/or a user.

15. In a computing environment, an apparatus comprising:

a protocol selector operable to negotiate an authentication protocol with a device associated with an entity, the authentication protocol utilized in conjunction with authenticating the entity seeking to gain access to a resource available via a first network;

a client component operable to authenticate the entity using the authentication protocol via the device associated with the entity;

an identity validator operable to obtain an identifier for the entity from a first identity system having a trust relationship with a second identity system, the first identity system residing on the first network, the second identity system residing on a second network, wherein the second network is different than the first network;

a proxy informer operable to indicate to a forward proxy whether the entity is authenticated, the forward proxy being one of a plurality of forward proxies distributed across one or more networks, the forward proxies structured to allow authenticated entities to access resources available via the one or more networks;

a history tracker operable to store information identifying the entity and information identifying resources accessed by the entity that are available via the first network; and a reporting component operable to provide the information in a form that identifies the entity and the resources accessed.

16. The apparatus of claim 15, the history tracker further operable to store a username with each Universal Resource Locator (URL) accessed by the entity.

* * * * *